United States Patent [19]

Brown, III

[11] Patent Number: 4,875,160

[45] Date of Patent: Oct. 17, 1989

[54] METHOD FOR IMPLEMENTING SYNCHRONOUS PIPELINE EXCEPTION RECOVERY

[75] Inventor: John F. Brown, III, Northborough, Mass.

[73] Assignee: Digital Equipment Corporation, Maynard, Mass.

[21] Appl. No.: 221,934

[22] Filed: Jul. 20, 1988

[51] Int. Cl.[4] .............................................. G06F 9/38
[52] U.S. Cl. ............................... 364/200; 364/231.8; 364/242.1; 364/247.6; 364/256.3; 371/12
[58] Field of Search ... 364/200 MS File, 900 MS File; 371/12, 16, 18

[56] References Cited

U.S. PATENT DOCUMENTS

| | | | |
|---|---|---|---|
| 4,612,612 | 9/1986 | Woffinden et al. | 364/200 |
| 4,701,844 | 10/1987 | Thompson et al. | 364/200 |
| 4,707,784 | 11/1987 | Ryan et al. | 364/200 |
| 4,750,112 | 6/1988 | Jones et al. | 364/200 |
| 4,794,518 | 12/1988 | Mizushima | 364/200 |
| 4,794,524 | 12/1988 | Carberry et al. | 364/200 |
| 4,794,527 | 12/1988 | Stewart et al. | 364/200 |

*Primary Examiner*—Jerry Smith
*Assistant Examiner*—James J. Kulbaski
*Attorney, Agent, or Firm*—Arnold, White & Durkee

[57] ABSTRACT

Pipelined CPUs achieve high-performance by fine tuning the pipe stages to execute typical instruction sequences. Atypical instruction sequences result in pipeline exceptions. The disclosed method provides graceful exception handling and recovery in a micropipelined memory interface. The use of a memory reference restart command latch allows an implementation that requires no additional logic for conditional writing of states pending exception checking. The exception handling hardware is minimized because instructions which cause exceptions are never re-executed, and exception handling microcode executes in-line with the normal microcode flow.

27 Claims, 9 Drawing Sheets

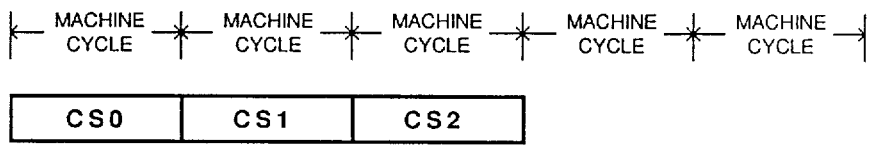
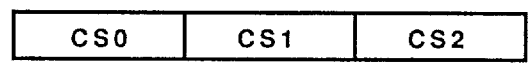
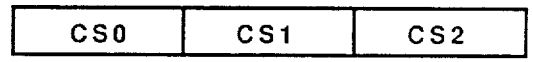
FIG. 12
| STAGE | CS0 | CS1 | CS2 |
|---|---|---|---|
| CYCLE 1 | n+1 | n | n-1 |
| 2 | n+2 | n+1 | n |
| 3 | n+3 | n+2 | n+1 |
| 4 | NO-OP | NO-OP | NO-OP |
| 5 | t | NO-OP | NO-OP |
| 6 | t+1 | t | NO-OP |
| 7 | t+2 | t+1 | t |
| ⋮ | ⋮ | ⋮ | ⋮ |
| (5+m) | t+m | t+m-1 | t+m-2 |
| (6+m) | n+2 | t+m | t+m-1 |
| (7+m) | n+3 | n+2 | t+m |
FIG. 13

METHOD FOR IMPLEMENTING SYNCHRONOUS PIPELINE EXCEPTION RECOVERY

FIELD OF THE INVENTION

This invention is directed to digital computers, and more particularly to instruction pipelining in a CPU to achieve maximum performance.

RELATED APPLICATIONS

This invention is related to the following applications, which are assigned to the assignee of the present invention and concurrently filed herewith in the names of the inventors listed:

Pipeline Bubble compression in a Computer System, William R. Wheeler and George Michael Uhler, Ser. No. 221,988.

Dynamic Microbranching with Programmable Hold on Condition, George Michael Uhler and George G. Mills, Ser. No. 222,097.

Pipelined Digital CPU With Deadlock Resolution, Douglas E. Sanders, George Michael Uhler and John F. Brown III, Ser. No. 222,008.

Application of State Silos For Recovery From Memory Management Exceptions, William C. Madden, Douglas E. Sanders, George Michael Uhler and William R. Wheeler, Ser. No. 221,944.

BACKGROUND OF THE INVENTION

A general purpose computer processes data by executing one or more of several predefined instructions in a particular sequence. An example of a computing machine is a hand held calculator. In this machine, the predefined instructions (the instruction set) may include only the arithmetic operations of addition, subtraction, multiplication and division. Data and the required sequence of instructions are input by the user one by one and an arithmetic calculation results.

The set of sequential instructions that a computer executes to produce a desired result is called a program. In general purpose machines with large instruction sets, the programs may be very large. Since computers execute the instructions much faster than users can input them, it is desirable to store the programs in electronic memories so that the computer can automatically read the instructions and thereby run at top speeds.

Most modern stored-program data processing systems are based on the Von Neumann model. The Von Neumann computer design is based upon three key concepts:

Data and instructions are stored in a single read-write memory.

The contents of this memory are addressable by location, without regard to the type of data contained in that location.

Execution occurs in a sequential fashion (unless explicitly modified) from one instruction to the next.

The primary circuits of the Von Neumann computer can be broadly grouped into two parts: a memory and a Central Processing Unit (CPU). The memory holds the data and the instructions for the computer system. The CPU can be considered the brain of the system. It contains electronic logic that sequentially fetches and executes the stored instructions.

Data in most digital computers is represented in the form of binary numbers. Each location in memory is capable of storing a binary number (the maximum size of which depends upon the type of computer system). The program or set of sequential instructions that the CPU instruction may occupy more than one location in memory. The first part of each instruction is called an opcode. The opcode is a unique binary number that tells the CPU which instruction it is. Most instructions have other parts that may contain operands (data to be processed) or operand specifiers. Operand specifiers inform the CPU where to find the operands that the instruction requires. These operands may be anywhere in memory or in certain temporary memory locations inside the CPU.

In general, the CPU performs the following operations to execute an instruction:

1. Fetch an instruction from memory.
2. Decode the fetched instruction to interpret the instruction.
3. Fetch from memory any operands (data on which the instruction operates) required by the instruction.
4. Perform the operation defined by the instruction.
5. Store the results of the operation in memory for future reference.

Different sets of hardware (called functional units) within the CPU carry out these operations. The functional units of a CPU may contain various registers (memory elements) and arithmetic and logic units (ALUs). The registers store temporary results and instruction operands (data on which an instruction operates). The ALU uses combinatorial logic to process the data present at its inputs. The output of the ALU depends upon the control signals provided to it, and is obtained from the input by performing an arithmetic operation or a logical (shifting or boolean) operation. The processing in the CPU is done by channeling data from operand registers through the ALU into result registers. The data may be channeled through the ALU many times for complex instructions.

Data is transferred between the basic elements of the CPU through common busses (set of wires that carry related signals). The data transfers are dependant on the type of instruction currently being executed and are initiated by a central controller. The CPU controller sends a sequence of control signals to the various registers of the CPU, telling the registers when to put data on the common read bus (going to the inputs of the ALU) and when to get data off the common write bus (coming out of the ALU). The CPU controller also tells the ALU what operation to perform on the data from the input to the output. In this way, the controller of the CPU may initiate a sequence of data transfers starting with fetching the instruction from main memory, fetching corresponding data, passing the data between the ALU and the various temporary storage registers, and finally writing processed data back to main memory.

The various implementations of a CPU controller fall under two main categories: hardwired and microprogrammed. Hardwired controllers use combinatorial logic and some state registers to produce a sequence of control signals. These control signals depend upon the type of instruction just fetched and the result of the execution of the previous instruction. The microprogrammed controller performs the same function but uses a ROM or RAM controlled state machine to produce the control signals from previous state and instruction inputs.

Hardwired controllers are tailored for a particular instruction set, and the logic used to implement them instruction set increases. Microprogrammed controllers are more general purpose devices, in that changes in the contents of the control store can be used to change the microinstruction flow, without changing the hardwired logic. While the hardwired controllers are fast, microprogrammed controllers provide more flexibility and ease of implementation.

In the simplest implementation of a microprogrammed CPU controller, each CPU instruction corresponds to a micro-flow stored in the control store. As used herein, a micro-flow refers to a micro-programmed subroutine. Each bit or decoded field of a micro-instruction corresponds to the level of a control signal. Sequencing through a series of such microinstructions thus produces a sequence of control signals. In a microprogrammed controller, each CPU instruction invokes at least one micro-flow (which may be just one micro-instruction long for small one cycle CPU instructions) to generate control signals which control ALU operations and data transfers on the CPU internal busses.

Computers are often classified into complex instruction set computers (CISCs) and reduced instruction set computers (RISCs) on the basis of the instruction sets that their CPUs support. CISCs commonly have a large instruction set with a large variety of instructions, while RISCs typically have a relatively small set of simple instructions. Since RISC CPUs have a few simple instructions, they can afford to use the fast hardwired controllers. CISC CPUs usually use microprogrammed controllers because of ease of implementation.

The simple configuration of data processing computers specified in the Von Neumann model of computation is frequently subject to enhancements in an effort to increase the computer's efficiency and usefulness. One such enhancement is the use of "virtual memory" techniques that allow programs to address more instruction and data memory space than is physically available. The portions of program or data that are not currently in use are stored in disk storage and are transferred when needed into physical memory. This loading of pages from disk when a nonresident memory location is accessed (i.e. when a "page fault" occurs) is called "demand paging."

In systems having virtual memory, a high speed associative memory called a "translation lookaside buffer" or "TLB" is often used to quickly translate virtual addresses into their physical memory address equivalents. The translation buffer caches the most recently used virtual-to-physical address translations. If a desired translation is not present in the translation buffer (i.e. a TLB "miss"), the translation process must halt, and so must the instruction which requested the faulting memory access. The desired translation is then read from a slower translation table in memory (which may itself be initially non-resident) and the translation loaded into the TLB. The construction and operation of the translation buffer is further described in Levy & Eckhouse, Jr., *Computer Programming and Architecture—The VAX*-11, Digital Equipment Corporation (1980) pp. 358-359.

Another enhancement technique frequently applied to the basic Von Neumann model of computation is directed not at the memory configuration, but at the execution scheme employed by the processing unit. The proven architectural modification of "pipelining" can significantly increase instructions in the CPU, thus engaging each functional unit in productive work for a greater overall percentage of time. In a pipelined CPU, the multiple functional units concurrently execute the basic constituent segments of a plurality of CPU instructions.

An example of a pipelined CPU is described by Sudhindra N. Mishra in "The VAX 8800 Microarchitecture," Digital Technical Journal, February 1987, pp. 20-33.

Since each functional unit can handle only one instruction at a time, it is necessary that all functional units in a pipeline advance the instructions that they are processing in a synchronized manner. Unlike in the assembly line analogy, however, the functional units in pipelined computer may require variable amounts of time depending upon the instruction that they are currently processing. If one of the functional units takes a long time to perform its function on a particular instruction, all the functional units that follow in the pipeline must wait for it to finish before they can advance their respective instructions to the next phase of the pipeline. This delay for the purpose of maintaining synchronization is known as a pipeline "stall". Pipeline stalls can also occur if a particular instruction needs to use results of a previous instruction in the pipeline which has not completed execution. The instruction that needs the results may stall the pipeline starting at the operand fetch unit, waiting for the previous instruction to pass through the pipeline and produce the operand that the stalled instruction requires.

In known RISC systems, most instructions use the various CPU functional units for equal amounts of time. Pipelining in RISCs can thus be accomplished by overlapping the execution of the simple CPU instructions, as described above. On the other hand, some CISC instructions can be quite complex, requiring numerous CPU register/ALU transfers and long periods of time to execute. Other CISC instructions may be relatively simple and require fewer transfers and much less time to execute. The disparity in functional unit usage among various CISC instructions would make a CISC instruction pipeline stall often and for relatively long periods of time. For this reason, the pipelining of CISC CPU instructions is more difficult.

CISC instructions of varying complexity may have correspondingly different sizes of microflows. Since each microinstruction provides the lowest-level control signals for one CPU cycle to all elements of the various functional units, in some CISC machines the execution of microinstructions is pipelined instead of the CPU instructions. This reduces stalling because the time of execution of each microinstruction is more nearly the same. In a microinstruction pipeline, each stage uses a few bits in the microinstruction that correspond to the functional unit of that stage. After each functional unit is done with the microinstruction that controlled its activity during a cycle, it passes this microinstruction to the next functional unit in the pipeline for the next cycle. The first functional unit gets a new microinstruction each cycle. In this way, the fundamental principle of pipelining—the overlapped instruction execution to utilize the various functional units in parallel—is realized.

CPUs which incorporate the above mentioned and other fine-tuned to execute typical instruction sequences. Thus the typical, or most frequent, sequences execute quickly. Atypical instruction sequences result in unusual conditions called pipeline "exceptions" which may force the CPU to change the flow of program execution. Depending on the instruction architecture, exceptions called "faults" may arise in the middle of execution of an instruction. In a computer system having virtual memory, for example, a "page fault" will occur during instruction operand fetching when the addressed operand does not reside in physical memory. In this case the current instruction cannot be completed, but it is desirable to use the CPU itself to carry out the demand paging to bring the desired operand from disk to physical memory.

Exceptions as described above, are infrequent and must not degrade performance of the typical case. The pipe stage logic must detect exceptions, but may be freed from the burden of correcting exceptional conditions. Once an exception has been detected during the normal operation of the pipeline, the processor must employ either hardware or software means to remedy the faulting condition, then cause the pipeline to resume normal operation. While the actual exception handling tends not to be performance-critical, the process must recover smoothly, leaving the pipeline ready for efficient subsequent instruction execution.

If the processor responds to exceptional conditions asynchronously (i.e. some time after the condition has already passed), the exception handling software or hardware must not only remedy the faulting condition, but also restore any erroneous results or information regarding the state of the CPU written during the time after the exception was detected and before it was resolved. Such backtracking or "rewinding" tends to be inefficient, since it delays the resumption of normal operation of the CPU. Furthermore, with asynchronous exception handling, the faulting instruction must be reexecuted upon restarting the pipeline, so that the operation it specifies can be successfully carried out.

If the pipelined CPU detects and responds to exceptional conditions synchronously, at the same time relative to the exception, the pipeline can be halted before any inaccurate instruction results are written. If the writing of results by the exception handler is prohibited, normal pipeline operation can be resumed as soon as the exception handler has fixed the faulting conditions, again starting with the re-execution of the faulting instruction.

It is desirable to employ a method of implementing recoverable pipeline exceptions which minimizes the amount of additional logic required to process the exception, and which allows for fast resumption of normal pipeline flow. In addition, it would be beneficial to eliminate the redundancy of executing the faulting instruction twice.

SUMMARY OF THE INVENTION

The present invention is primarily applicable to a microprogram-controlled processor which supports a complex instruction set through the pipelining of microinstructions. During the normal sequence of operation, an instruction decoding unit decodes instructions one after another to generate a sequence of control information (in the form a microinstructions) which is passed to the first microinstruction execution pipeline stages process data sequentially and simultaneously in respective pipelined data processing units in response to the control information while the decoding segment is generating new microcoded control information. The execution segments include at least a memory unit for storing and fetching data and a processing unit for performing operations on the data. The processing of data can potentially cause an exceptional condition called a fault which must be corrected before the processing of the data can be completed. The fault is corrected by interrupting the normal sequence of instruction execution in the pipeline and using microcoded software means to correct the fault.

In order to reduce the processing time required for correcting the fault, and in order to support the use of microcoded software routines for fault servicing, the microinstruction pipeline is provided with "state silos" that are operative during normal instruction execution and are used to save a sufficient amount of state information (including the values of various CPU and operating system registers, program counter values, pipeline status information, and past ALU results) to immediately restart the pipeline upon completion of exception handling. A detailed description of the application of state silos in saving the state of a pipeline can be found in a related application assigned to the assignee of the present invention and concurrently filed herewith in the names to the inventors listed: "Application of State Silos For Recovery From Memory Management Exceptions", William C. Madden, Douglas E. Sanders, G. Michael Uhler and William R. Wheeler, Ser. No. 221,944. By saving the state of the pipeline before invoking microcoded exception handling software, the execution of the exception handling routines can be accomplished by the same pipeline hardware used for normal instruction execution, thus reducing the amount of additional hardware required for exception handling. Normal instruction execution can be immediately resumed after exception handling by reloading the saved state information into the pipeline.

In a preferred embodiment of the invention, a faulting microinstruction is allowed to complete all operations which are not directly affected by the faulting conditions. The exception handling microcode is further given the responsibility of completing all operations which were inhibited due to the faulting condition, thus eliminating the need to re-execute the faulting instruction after exception handling. Also, conditional writing of the state during execution of the faulting instruction which is not directly affected by the fault, is not required.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 2 is an electrical diagram in block form of

FIG. 12 is a diagram of events vs. time of pipelined instruction execution in the CPU of FIGS. 1-8;

FIG. 13 is a listing of states in execution of microinstructions in the pipeline CPU of FIGS. 1-11.

DETAILED DESCRIPTION OF A PREFERRED EMBODIMENT

Figure 1:
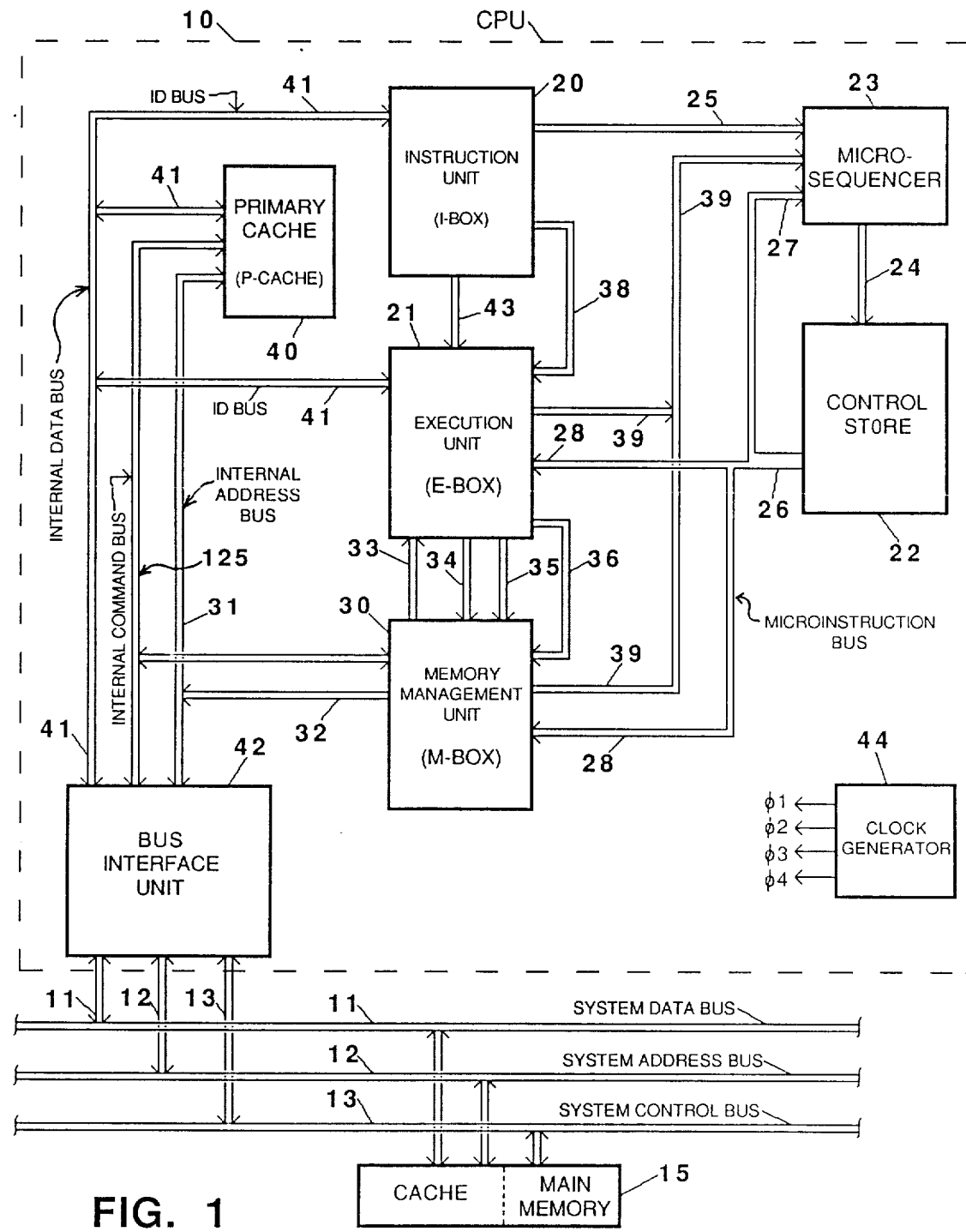
FIG. 1 is an electrical diagram in block form of a computer system including a central processing unit according to one embodiment of the invention.

The CPU:

Referring to FIG. 1, a CPU or central processing unit 10 which may use the features of the invention is illustrated. In a preferred embodiment, the CPU 10 is constructed as a single integrated circuit, but the CPU may be an integrated circuit chip set, or may be implemented with standard logic circuits or gate arrays mounted on one or more circuit boards. Although this invention is useful in any pipelined CPU, the example given here is one which executes a VAX instruction set and generally conforms to the architecture of VAX computers previously sold by the assignee. In the illustrative embodiment, the CPU 10 is connected to a system data bus 11, for example a 64-bit bidirectional bus, and to a 27-bit system address bus 12 and a system control bus 13, These busses 11, 12 and 13 are connected to system memory 15 which is not shown in detail but would usually include cache and cache controllers. The busses also access various I/0 equipment.

The CPU 10, in its internal construction, includes an instruction unit 20 (referred to as the "I-Box") which functions to decode machine-level instructions for execution, along with an execution unit 21 (referred to as the "E-Box") which performs the data-manipulation part of the execution of the instruction. The CPU 10 is of the microcoded type, and employs a control store 22 which consists of a ROM (or EPROM, or the like) containing perhaps 1K or 2K words of microinstructions, with each word being fifty bits wide in this example. The control store is addressed by a microsequencer 23 which generates a series of microaddresses on an 11-bit address input 24 of the control store 22, based upon an entry point address or dispatch address received from the instruction unit 20 by an 11-bit dispatch bus 25. The output from the control store 22 is a microinstruction bus 26, 50-bits wide in this embodiment; sixteen bits of the bus 26 are connected addresses of microinstructions in a sequence following an entry point, and to provide control of the microstore addressing. The remaining thirty-four bits of the microinstruction output 26 are used as control inputs 28 to the execution unit 21 and other parts of the CPU.

The CPU 10 uses virtual addressing, and a memory management unit 30 (also referred to as the M-Box) is employed to translate a virtual address to a physical address. This unit also arbitrates instruction fetches for the instruction unit 20. The memory management unit is controlled by the 34-bit input 28 from the microinstruction bus, as well as other signals. The unit 30 is connected to a 30-bit internal address bus 31 via output 32, and is connected to the execution unit 21 by a 32-bit ALU AABus 33 for reading address registers from the memory management unit. Other connections between the memory management unit 30 and the execution unit include a 32-bit ALU output bus 34 and a 32-bit write-data bus 35; functions of these busses 33, 34 and 35 will be explained in reference to the internal construction of the execution unit 21. The unit 30 receives control bits via lines 36 from the execution unit for the purpose of defining the memory operation and word length; these control bits on lines 36 originate in the instruction unit 20 and are coupled to the execution unit 21 as part of a control bus 38. The memory management unit 30 as well as the execution unit 21 generate controls defined as microtest which are connected to an input of the microsequencer 23 via 3-bit bus 39; this is conditional data for microinstruction branching as determined by events within the execution unit 21 or memory management unit 30.

The CPU 10 includes a primary cache 40 (also called "P-Cache") which is in the example a 2K-byte high-speed RAM containing the most recently used memory data, this being either instructions or data. The cache 40 is connected to the 30-bit internal address bus 31, and to a 32-bit internal data bus 41. The internal data bus 41 also conveys instructions fetched by the memory management unit 30 for use by the instruction unit 20, and operands transferred to or from the execution unit 21.

A bus interface unit 42 controls or arbitrates the connections between the various internal busses of the CPU 10 and the system busses 11, 12 and 13, based upon an internal command bus, as well as clocks and other control bits.

Immediate (or literal) operands or addresses, contained in the instruction stream are loaded into the instruction unit 20 by bus 41. These operands are transferred to the execution unit 21 for loading to registers by a 32-bit bus 43.

A clock generator 44 produces a four-phase output (phi-1 to phi-4) which establishes a machine cycle of four phases P1, P2, P3 and P4 as will be referred to. For an example, the clock rate is 25-MHz, producing a machine cycle of 40 ns.

Figure 2:
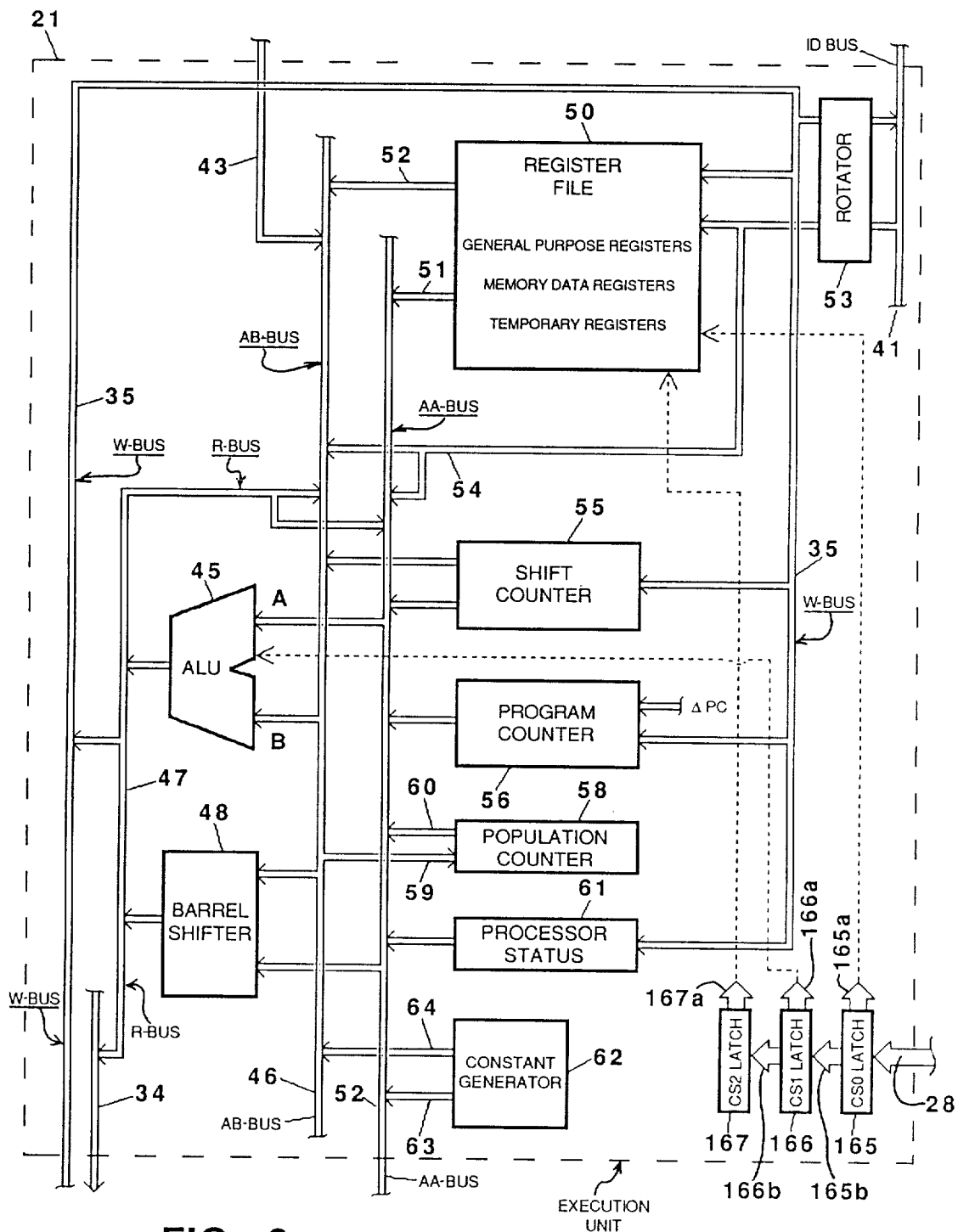

The Execution Unit:

Referring now to FIG. 2, the execution unit 21 is shown in more detail. This unit includes a 32-bit ALU 45 which has a 32-bit wide A-input from the AABus 33 and a 32-bit wide B-input from an ABBus 46. The ALU 45 performs the Add, Subtract, OR, etc., operations as needed to support the instruction set of the CPU, as defined by a field of the currently-used microinstruction from the bus and thus to the write bus 35. The only two sources of data to the result bus are the ALU and a barrel shifter 48, which is a 64-bit in, 32-bit out, shifter unit that implements shift operations of the instruction set. Zero to 32-bit right shifts and zero to 32-bit left shifts can be performed, under control of fields in the microinstructions sent via the bus 28. The data on the result bus 47 can be loaded to the AABus 33 or the ABBus 46 for bypass, or to the write bus 35, as well as to the ALU output bus 34 going to the memory management unit 30.

The write bus 35 can write to a register file 50, which is a set of forty-one 32-bit registers, including fifteen general purpose registers, eighteen temporary registers, and eight memory data registers; these registers contain operands and addresses currently being used, and writing to and reading from the register file is under control of fields of the current microinstruction, the only output of the register file being by 32-bit outputs 51 and 52 to the AABus 33 or ABBus 46. The internal data bus 41 can also write via rotator 53 to certain registers of the register file as determined by the microinstruction, and the internal data bus can also bypass the register file and write directly to the AABus and ABBus via input 54, as when data from the internal data bus is being written to a register file and is also being used as an ALU input in the same cycle.

A shift count register 55 provides a shift count for the shifter 48, and also functions to count cycles (as useful in multiply or divide). This counter 55 is a 32-bit register which may be loaded from the write data bus 35 or loaded to the AABus or ABBus under microinstruction control.

A 32-bit program counter or PC 56, containing an internal adder, is also part of the register set. The PC 56 contains the address of the instruction being executed. As an instruction (including opcode and operand specifier bytes, and specifier extensions) is parsed in the instruction unit 20, the PC 56 is updated to track the address by the delta-PC bits from the instruction unit on bus 38. The program counter may also be loaded from the write bus 35. The output 57 of the program counter 56 is to the AABus, from which the address passes through the ALU 45, and, ordinarily, to the memory management unit 30 via bus 34.

A counter circuit 58, referred to as the population counter, receives its input 59 from the ABBus 46 and produces an output 60 to the AABus 33; this circuit functions to count the number of bits set in a binary word loaded to the ABBus and to produce a binary value equal to this count of bits. The population counter 58 is used to count the number of bits in a save mask (a binary word, each set bit of which corresponds to a register that needs to be saved) where the binary value is used to determine the number of registers from the register file 50 or register set that must be saved in a procedure CALL, RETURN, Push-Register, or Pop-Register.

A processor status register 61 is also included in the set of registers of the execution unit 30. This status register contains the ALU condition bits, such as carry, overflow, zero and negative, as well as various other status bits such as interrupt priority level, trace pending, etc. The status register can be read onto the AABus 33, or written via the write bus 35, under A constant generator 62 produces constants for loading to the AABus or ABBus via outputs 63 and 64. The microinstruction can contain an 8-bit constant in a field of the bus 28 (a "microinstruction literal"), and this byte can be loaded to the ABBus by the constant generator 62 at any of the four byte positions of the 32-bit word width as determined by another 2-bit field of the current microinstruction. Also the generator can produce a constant of 1, 2, 4 or 8 in response to the value of the data-length DL control bits on lines 38, and this constant, representing the number of bytes in the operand to be handled, is loaded to the ABBus 46 via output 64. The constant generator is also used along with the shifter for sign-extending data.

The rotator 53 is the I/O interface between the execution unit 21 and the internal data bus 41, and functions to align the data on longword boundaries when loaded to the registers or bus of the execution unit, or to restore the data going from the execution unit 21 to memory to the intended byte positions. The two least significant bits of the address, and data length (DL control bits on bus 38), are used by the rotator 53 to make these transitions.

Figure 3:
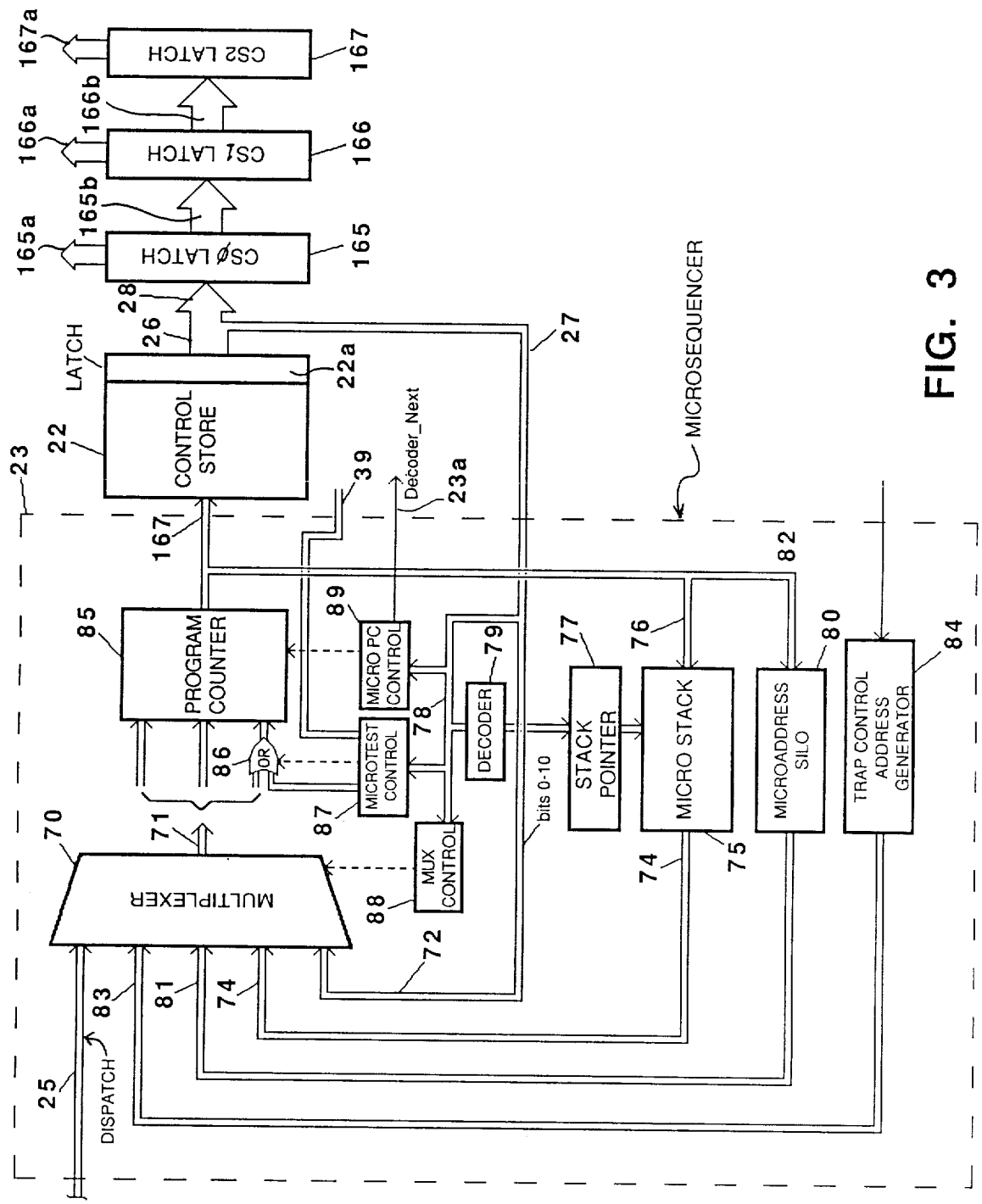
FIG. 3 is an electrical diagram in block form of the microsequencer of the CPU of FIG. 1.
Figures 4, 5:
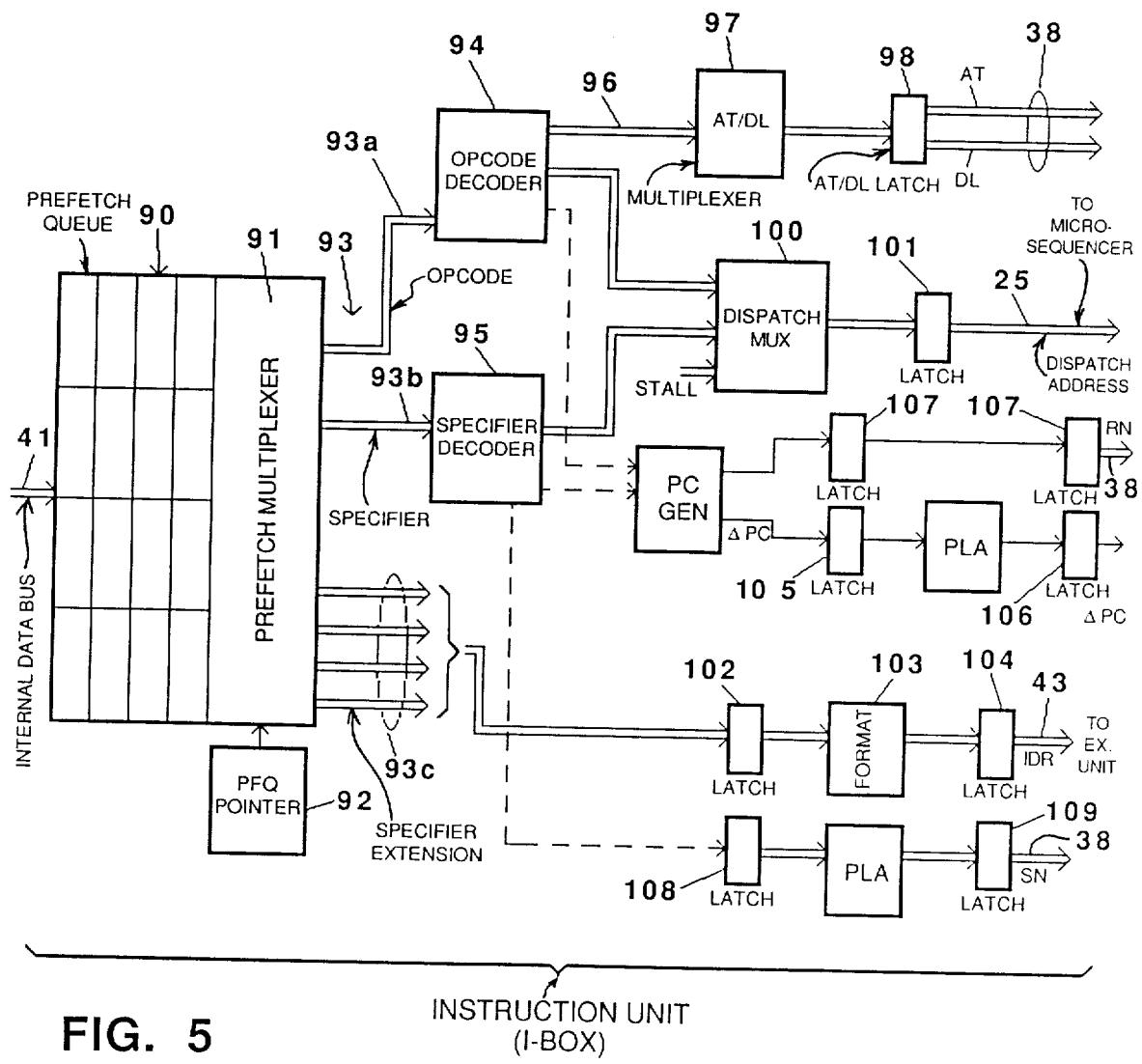
FIG. 4 is a diagram of the format of microinstructions contained in the control store of FIG. 3.
FIG. 5 is an electrical diagram in block form of the instruction unit of the CPU of FIG. 1.

The Microsequencer:

Referring now to FIG. 3, the microsequencer 23 is shown in more detail. The microsequencer produces an 11-bit address to the address input 24 of the control store 22 in every machine cycle, and at the beginning of the next cycle the control store 22 produces a 50-bit output at the latch 22a and on bus 26, sixteen bits of which are fed back into the microsequencer for address and control by bus 27. These sixteen bits include an address for the next microinstruction, along with control information. FIG. 4 shows the format of the 16-bit data on the bus 27, where the two types of address and control information are seen to be a jump and a branch. The jump includes an 11-bit jump address, bits 0–10, and a 3-bit mux-control field, bits 12–14, while bit-15 is always "0" for a jump (and always "1" for a branch). Bit-11 is for microsubroutine control, for either type. The branch format includes a 7-bit offset, bits 0–6, and a 4-bit branch condition selector field.

The mux-control field is used in the microsequencer 23 of FIG. 3 to control a multiplexer 70 to produce one microaddress output 71 from a number of inputs; one input 72 to the multiplexer 70 is the jump address field, bits 0–10 from the bus 27, and of course another is the dispatch address 25 from the instruction unit 20. If the microinstruction on the output 26 is the last one of a routine or microflow, a "decoder-next" output is asserted on a line 23a, to cause the I-Box 20 to produce a new dispatch.

A third input to the multiplexer 70 is an output 74 (a stack read bus) from a register stack 75. The microaddress stack 75 is a push-down stack for storing up to eight of the 11-bit addresses appearing on the bus 24 and thus appearing on an input write bus 76 for the stack. A stack pointer 77 points to the TOS or top-of-stack, and this pointer is incremented or decremented for PUSH or POP stack operations by controls from the bits 11–15 of the control information on the bus 27, as connected via bus 78 to stack control decoder 79. If a CALL is decoded, the 11-bit address on input 76 is PUSHed to the stack 75, or if a RETURN is decoded the TOS is selected as the input to the multiplexer 70, and the stack is POPed by decrementing the pointer 77.

A microaddress silo 80 provides another input 81 to the multiplexer 70. This silo is a FIFO memory having three registers, storing the three last-used 11-bit addresses from the address bus 24, via input 82. This silo is constructed as a shift register which is clocked forward by each machine cycle, except when a stall or a trap is signalled, in which case the three addresses in the silo are saved until a trap ends, when the last three addresses may be used by jumping to a recover micro-routine, which will use the silo input 81 by the proper code to the multiplexer via bus 78.

The other input to the multiplexer 70 is an output 83 from a trap control address generator 84. A number of different types of trap microroutines, and thus addresses for starting these microroutines, are available.

A branch address, specified when bit-15 on bus 78 is a "1", is made up of three parts, assembled in the microprogram counter 85. Bits 7–10 of the 11-bit branch address are copied from the current microinstruction (i.e., the one currently already in the counter 85), and bits 0 and 4–6 are copied from the microinstruction by the input 72, while bits 1–3 are the logical OR, via gate 86, of the microinstruction on input 72 and the contents of the 3-bit microtest bus 39. That is, "Branch" type microinstructions (microbranch instructions) are detected on the microinstruction bus 28 by the microtest control logic 87. Upon detecting a microbranch instruction, the control logic 87 forwards conditions present on the microtest bus 39 to the OR gate 86, and, at the same time, MUX control logic 88 also detects a microbranch instruction on the microinstruction bus 27, and causes the microprogram counter 85 to compute a branch destination address based on the OR-ing of the conditions on the microbranch bus 39 and selected bits from the microbranch instruction provided as input to the multiplexer 70.

Also seen in FIG. 4 is the format of the microinstruction word, particularly the 34-bit part appearing on the bus 28 at the output of the control store. Four general types of microinstructions are used, these being referred to as Basic, Constant, Shift and Special. For each of these, bits 16–33 are the same and include a 6-bit "A" field (bits 16–21) which selects the source of the AABus 33 in the execution unit, and a 6-bit "W" field (bits 28–33) to select the destination, i.e., where the write bus 35 is written, such as one of the registers in the register file 50. Bit-27 is a condition code control for the processor status register 61. The miscellaneous field, bits 22–26 is decoded to define the particular operation to be performed. The Basic, Shift and Special types all have a "B" field (bits 34–37) which selects the source of data on the ABBus 46, i.e., the ALU B input. The Shift type has fields (bits 38–46) which define the shift function to be performed in the shifter 48 and the shift value (number of bits from zero to 32-bits). The Constant type of microinstruction format includes a constant value (bits 34–41) for a microinstruction literal operation, to be loaded to AABus via constant generator 62, and a position field (bits 42–43) for defining constant position. The function to be performed by the ALU 45 (e.g., Add, Subtract, AND, Pass, etc.) is defined by bits 44–48 of the Basic format or bits 44–46 of the Constant format. The bit-38 of Basic is a data word length control, and bits 39–43 define the memory request function.

The Instruction Unit:

In FIG. 5, the internal construction of the instruction unit 20 is illustrated. Instructions are loaded from internal data bus 41 into a prefetch queue 90, which is a FIFO constructed as a set of high-speed registers holding four 32-bit longwords (four four-byte instruction and operand words). Since the instructions are of variable length, having a variable number of operands and specifiers following an opcode of one or two bytes, and might not be aligned on word boundaries, the prefetch queue 90 functions to allow the information needed to begin parsing and decoding the next instruction or operand to be immediately accessible. The prefetch queue is capable of shifting up to two longwords in a machine cycle; instruction stream data is supplied to the input of the prefetch queue 90 whenever the queue is not full and no other system process requires the data path. A prefetch multiplexer 91 receives 4-bit address information from a prefetch pointer 92 to produce at an output 93 six bytes from the prefetch queue 90 which represent the next six valid bytes starting with an opcode; the opcode might not be on a longword boundary, so the output 93 includes an opcode byte 93a, a specifier byte 93b, and four bytes 93c of specifier extension field selected from queue 90 by the multiplexer 91 beginning at any of the byte positions of the queue. Two of these six bytes are connected to a set of decoders or PLA's including an opcode decoder 94 and a specifier decoder 95.

Based upon the opcode byte on output 93a, the decoder 94 produces on output 96 several sets of access type and data length control bits (referred to as AT/DL controls), one set for each operand to be used for this instruction. A multiplexer 97, receives this output 96 and selects one set for each operand as it is being defined. The output of multiplexer 97 is held in a latch 98, from which the AT/DL part of the control bus 38 going to the execution unit 21 is obtained.

A dispatch multiplexer 100 selects whether the dispatch address 25 to be sent to the microsequencer 23 is an execution dispatch from the instruction decoder 94, a specifier dispatch from the specifier byte decoder 95, or a stall dispatch. A stall dispatch is produced whenever there are insufficient bytes in the prefetch queue 90 to define an execution or specifier dispatch. This stall dispatch merely forces a dispatch address to the microsequencer 23 to address a microinstruction which does nothing but issue a "decoder next" request back to the L-Box, thus a do-nothing cycle is introduced to allow the I-Box to fill the PFQ. The 11-bit address output from this multiplexer 100 is latched into a dispatch address latch 101, so it can be available for siloing. The specifier extension data, up to four bytes on the outputs 93c from the queue 90, is applied to a latch 102, from which it passes though a formatter 103 which sign-extends and right-justifies any specifier extension data that may exist, then to another latch 104 from which this data is connected by 32-bit bus 43 to the execution unit 21.

Also, the I-Box produces a delta-PC value in latch 105, which represents the amount the program counter 56 should be incremented in order for the E-Box PC 56 to point to the next opcode or specifier, this being based upon the number of bytes in the opcode and specifiers currently being processed. The delta-PC value in latch 105 is transformed by a PLA then loaded to a latch 106 to via bus 38. In addition, the I-Box produces a 4-bit RN field in latches 107, which specifies one of the sixteen general purpose registers in register file 50 that is to be used for the current specifier or execution microflow. This RN field is derived from the register field of a specifier byte. Further, a 3-bit SN field is produced in a latch 108 to specify the memory data register in the register file 50 that should be used to store the result of the current specifier flow. The value in the latch 108 is transformed in a PLA and loaded to latch 109 in the second cycle, ready for use by the E-Box in the third cycle via bus 38.

Figure 6:
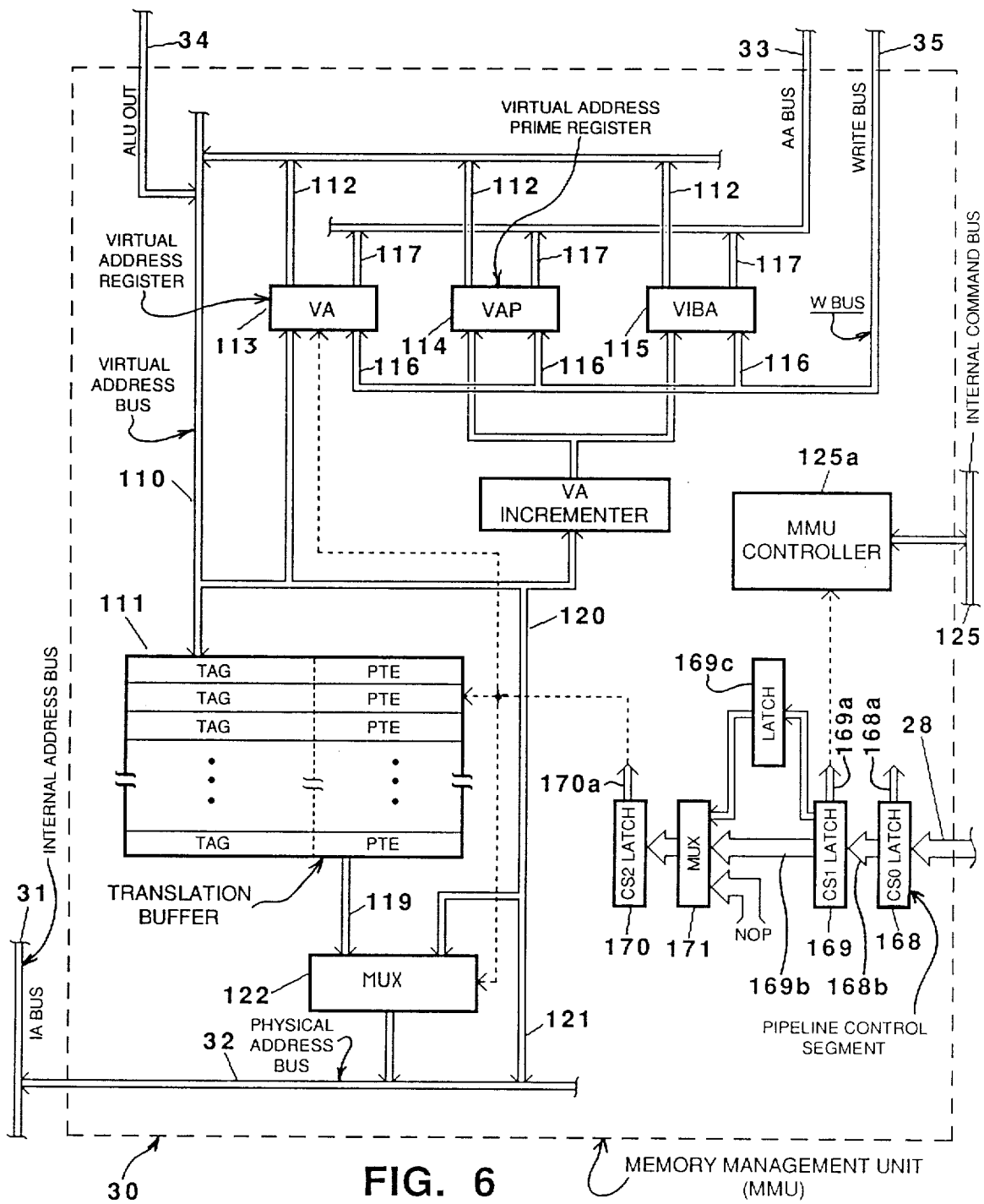
FIG. 6 is an electrical diagram of the memory management unit of the CPU of FIG. 1.

The Memory Management Unit:

The memory management unit 30 is seen in detail in FIG. 6. Any address for instruction or data read or write appears on a 32-bit virtual address bus 110, and this virtual address is used in a translation buffer 111 to generate a physical or real address which appears on the bus 32 going to the internal address bus 31. The virtual address may be generated at the output of the ALU 45 in the execution unit 21 and applied by the ALU output bus 34 to the virtual address bus 110, or it may be loaded to the bus 110 via outputs 112 from three registers, these being a virtual address register 113, a virtual address prime (VAP) register 114, and a virtual instruction buffer address (VIBA) register 115. The three registers 113, 114 and 115 allow many addresses to be generated without using the main data paths and ALU of the execution unit 21. Each of these registers can be written from the write bus 35 via inputs 116, or read via outputs 117 and the AABus 33, under control of the W and A fields of the microinstruction. The VA register 113 provides the address for write operations, and it also latches the virtual address from the bus 110 for every memory request, so if a memory management exception occurs, a microinstruction can always access the faulting address in the VA register 113. The VAP register 114 always latches the VA bus 110 plus four, so it contains the address of the next sequential longword; this register is used by microinstructions to access multiple longwords, and also to access the second longword of unaligned memory references, i.e., a memory reference that requires a second reference to complete. The VIBA register 115 is loaded whenever a microinstruction performs a flush and load of the program counter 56; the VIBA register is then used to prefetch longwords of instruction stream data from memory for filling the prefetch queue 90, being incremented by four after every instruction stream longword fetch. An incrementor functions to increment the registers 114 and 115 by four.

The translation buffer 111 is a fully associative memory containing sixty-four locations, each location containing a tag of a recent successful translation along with the page table entry (PTE) for this tag. The page address (bits 9–31) of each virtual address received from the bus 110 by the translation buffer is compared to the 23-bit tag of all sixty-four entries, and if a match occurs the PTE corresponding to the matched tag is output on bus 119 (21-bits). The lower thirty bits of the virtual address bus 110 appear on a bus 120, from which bits 0–8 are applied directly to the internal address bus 32 via lines 121 and constitute the byte address within a page; the twenty-one bits 9–29 from the VA bus 110, via PTE from the translation buffer are the other input via bus 119, so the upper 21-bit part of the address applied to the internal address bus 31 via bus 32 is thus either directly from the VA bus or translated via the buffer 111 and the PTE. That is, by microinstruction control, the address applied to the internal address bus 31 may be directly from the VA bus 110, or it maybe a translated address using the translation buffer 111.

If the page of the address on the VA bus 110 is not among the sixty-four tags in the buffer 111, and a translated address has been specified, then a fault condition is signalled, this being a TB fault. The microsequencer 23 produces the starting address for a routine that allows the page address to be looked up in a table maintained in memory 15 or cache by the operating system; this of course will require a number of microinstruction cycles to accomplish.

A controller 125a within the unit 30, responsive to the microinstruction currently asserted for each segment of the unit 30 in the pipeline (as explained below), produces a command on the internal command bus 125 for defining the operation of the bus interface unit 42.

Figure 7:
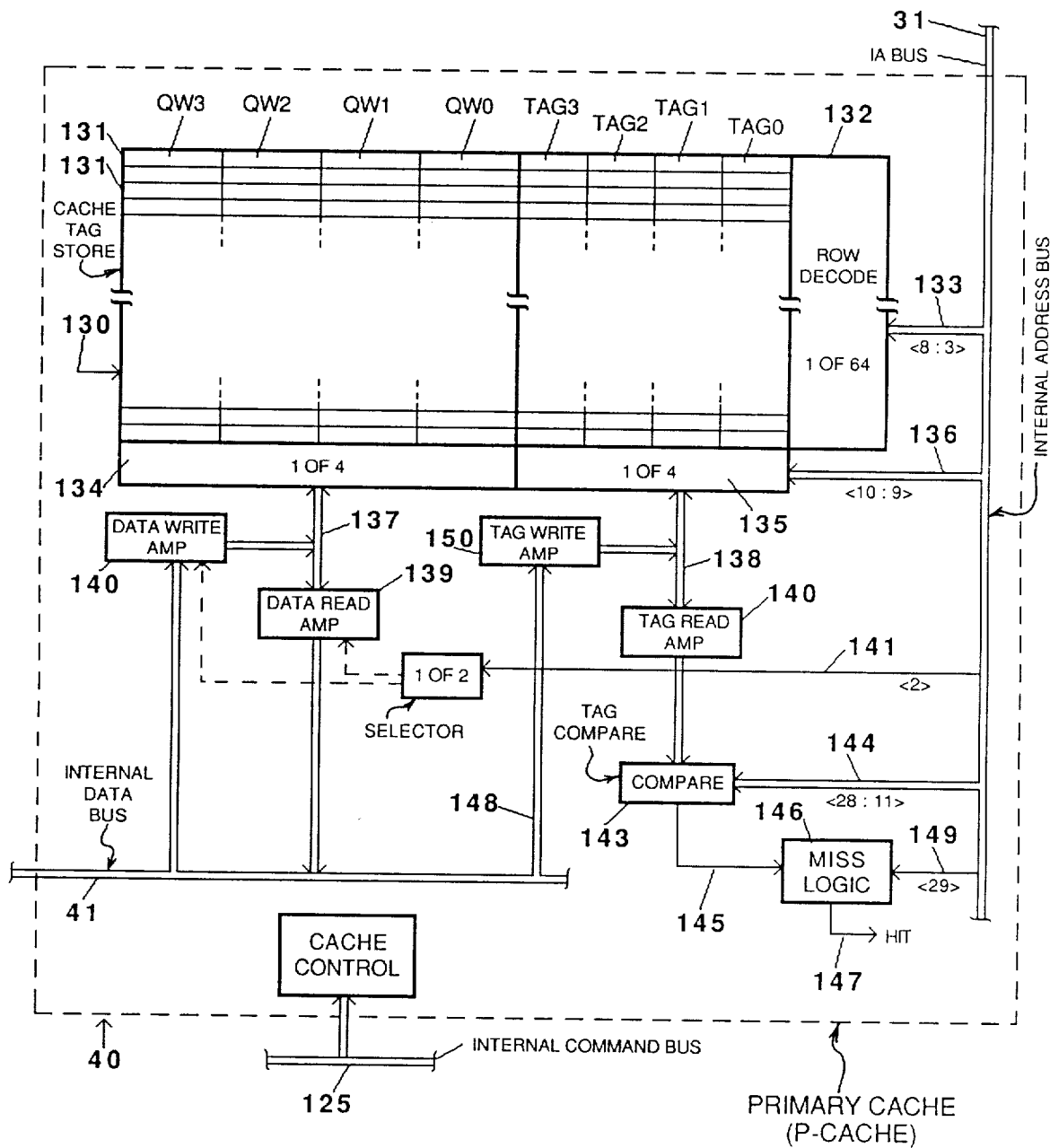
FIG. 7 is an electrical diagram in block form of the primary cache or P-cache memory of the CPU of FIG. 1.

The Primary Cache:

Referring now to FIG. 7, the primary cache or P-Cache 40 is shown in more detail. This cache contains a 2K-byte high-speed memory 130 which is addressed by the internal address bus 31 and which reads to or is written from the internal data bus 41. The memory 130 is organized as sixty-four rows with four quadwords QW0, QW1, QW2 and QW3 in each row, along with four corresponding tags Tag0, Tag1, Tag2 and Tag3, one for each quadword. A row decoder 132 selects 1-of-64 based upon six bits 3–8 on lines 133 from the internal address bus 31. The row selected will be loaded to a column decoder 134 for the data and a column decoder 135 for the tags, where a 1-of-4 selection is made based upon two bits 9–10 on lines 136 from the IA bus 31. In this manner, one tag (19-bits) and one quadword (64-bits or eight bytes) are selected at data and tag I/O busses 137 and 138 within the P-Cache. The data bus 137 is read by sense amplifiers 139, or written by write amplifiers 140, where another 1-of-2 selection is made based upon bit-2 on line 141 from the IA bus 31, so that a selected 32-bits or four bytes are loaded to or transferred from the internal data bus 41, if there is a tag hit. The tag read from the selected location in cache memory 130 is compared in a comparator 143 to the eighteen bits 11–28 from the IA bus 31 via lines 144. If all bits are the same, a hit is signalled on line 145, from which miss logic 146 produces a P-Cache hit output on line 147 if bit-29 of IA bus 31 via line 149 does not indicate that the reference is to I/O space, since I/O references are never cached. A write amplifier 150 is also provided for the tag I/O bus 138 for loading the tags when the cache 130 is filled.

Figure 8:
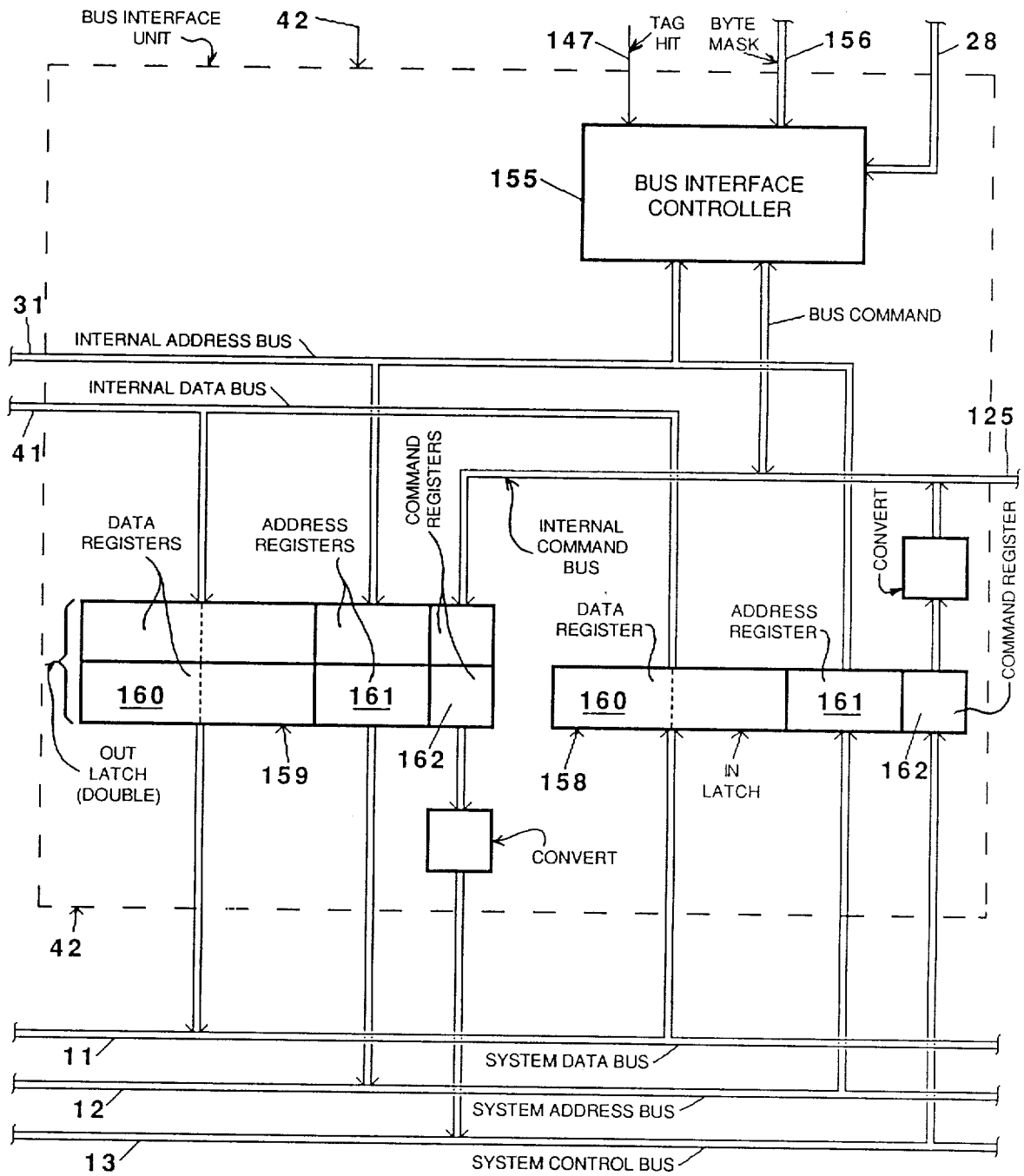
FIG. 8 is an electrical diagram in block form of the bus interface unit of the CPU of FIG. 1.

The Bus Interface Unit:

Referring to FIG. 8, the bus interface unit 42 drives the 27-bit system address bus 12 based upon the 30-bit physical address on the internal address bus 31; the difference is because the 30-bit address on the bus 31 is a byte address and the 27-bit address on the bus 12 is aligned for quadwords (eight bytes), corresponding to the quadword (64-bit) width of the system data bus 11. To allow this transition, and to allow various data lengths, aligned or non-aligned, the control bus 13 contains an 8-bit byte mask field which includes a bit for each of the eight possible byte positions, and a controller 155 in the bus interface generates an 8-bit byte mask for applying to the system control bus based upon an internal 4-bit byte mask generated in the memory management unit and connected to the bus interface by lines 156. The memory management unit uses the data length DL control bits on lines 36, originating in the decode of opcode and operand specifiers in I-Box 20 via bus 38, and of course the low-order bits 0–2 of the address on bus 31 defines the starting byte address. In this manner, transition is made between the 32-bit internal data bus 41 and 64-bit system data bus, and between the 30-bit internal address bus and the 27-bit system address bus.

The system control bus 13 also contains a 4-bit bus command, which is driven by or received by the controller 155 of the bus interface unit 42. This bus command defines what operation is occurring on the system busses, i.e., the CPU 10 reading instruction stream quadwords from memory 15, the CPU 10 reading data stream quadwords, the CPU 10 writing to memory 15, etc. This 4-bit command is asserted along with an address strobe which is another of the lines of the control bus 13, which also includes lines for Ready, Read, DMA Request, Interrupt, Halt, as well as coprocessor controls, as may be needed for implementing a complete system.

Data and addresses, and bus commands, are transferred in and out by an in-latch 158 and a dual out-latch 159, each of which contains a 64-bit data register 160, a 27-bit address register 161, and a bus command register 162. In this manner, the in-latch 158 can receive a 64-bit quadword from bus 11 in one cycle and transfer two 32-bit longwords to the internal bus 41 in two cycles. Likewise, each out-latch 159 can load two 32-bit longwords in two cycles then a 64-bit quadword can be transfered to the system bus 11 in one cycle. The reason for having two identical out-latches is to speed up CPU 10 writes to memory, since the memory write operation on the external busses 11, 12, 13 takes three cycles; with two out-latches the second can be loading while the first is being written to memory 15 via the system data bus 11.

A memory read transaction is implemented by the bus interface unit 42 when the internal command bus 125 indicates a memory read, as signalled from the memory management unit 30, occurring when the memory management unit is requesting data specified by the physical address driven onto the internal address bus 31. If this address is found in the primary cache 40 tag store, the cache 40 drives the internal data bus 41 with the data and the intended receiver (I-Box 20 or E-Box 21) latches the data from the data bus 41. If the tag misses in the tag compare 143 of the primary cache, the tag hit signal on line 147 is de-asserted, and the read command on lines 125 and the physical address on bus 31 are loaded into the out-latch 159, and the controller 155 takes over and services this read request whenever the system busses are available in the next few cycles; no further commands from the M-Box 30 will be serviced until the requested data has been received and latched into in-latch 158. The unit 42 drives the data from the in-latch onto the bus 41 and thus to the intended destination, the I-Box, the E-Box or P-Cache. As an example, if the primary cache misses, and the data must be fetched from main memory 15, the read transaction may take six machine cycles, during which the pipeline of the CPU is stalled.

A memory write sequence begins with a write command being asserted on the internal command bus 125 by the M-Box, at which time the M-Box also drives the internal byte mask onto lines 156. Because the cache 40 is of the "write-through" type, all memory writes are "tried" in the cache and executed in main memory. Thus when a write command is on the internal command bus 125, the P-Cache 40 compares the address on the bus 31 to its tag array. If the reference hits, the data then on the ID bus 41 is written into the cache RAM 130. If the tag compare misses, the data is ignored by the P-Cache. In either case, the data on the IA bus 31, the ID bus 41, the internal command bus 125 and the byte mask, are all loaded into the out-latch so that an external write sequence can write to main memory (and a back-up cache if used).

Figure 9:
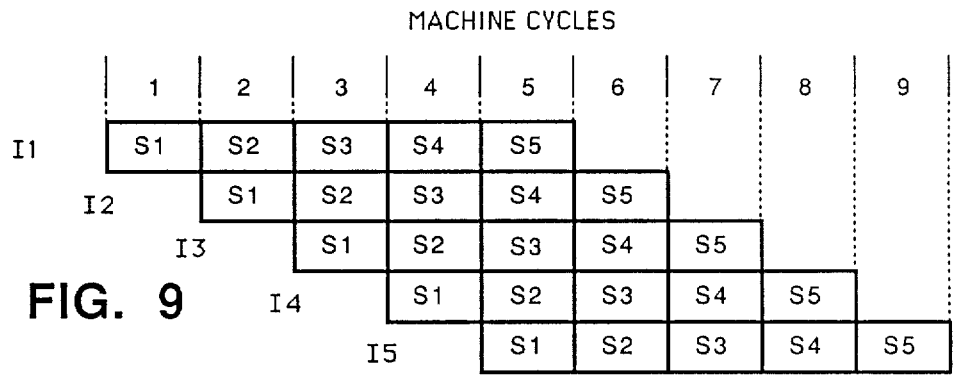
FIG. 9 is a timing diagram showing events occurring in the pipelined CPU 10 of FIG. 1 in successive machine cycles.

Pipelining:

The CPU 10 of FIGS. 1–8 is highly pipelined; events in the execution of an instruction are spread over many machine cycles, and execution of parts of a number of instructions are overlapped, i.e., occurring at the same time. The CPU uses a five-segment pipeline, as illustrated in a general sense in FIG. 9, where an instruction I1 is seen to begin its execution in segment s1 during cycle 1, and continue through segment s5 in cycle 5. Instruction I2 begins execution in segment s1 in cycle 2, when instruction I1 is in segment s2, and likewise continues through to segment s5 in cycle 67. In cycle 5 and thereafter, there are parts of five different instructions executing in parallel in the five segments of the pipeline. Of course, FIG. 9 is an idealistic situation, where it is assumed that every instruction executes in exactly five segments, and there are no stalls or exceptions; in this ideal case the average execution rate would be one instruction per machine cycle.

Figure 10:
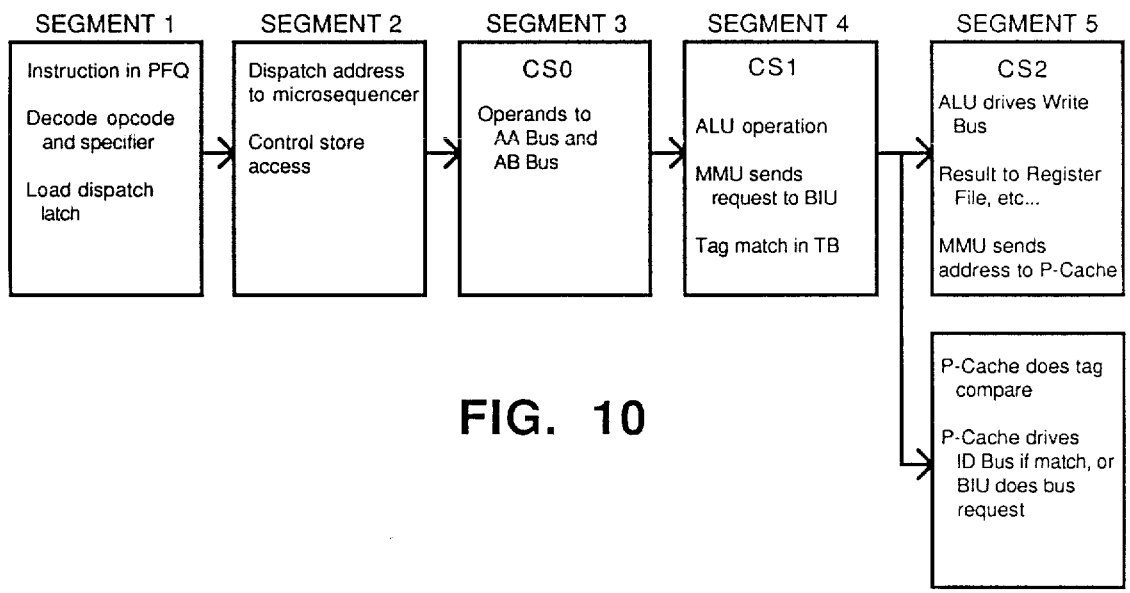
FIG. 10 is a diagram events vs. time showing detail of one instruction execution in the CPU of FIG. 1-8.
Figure 11:
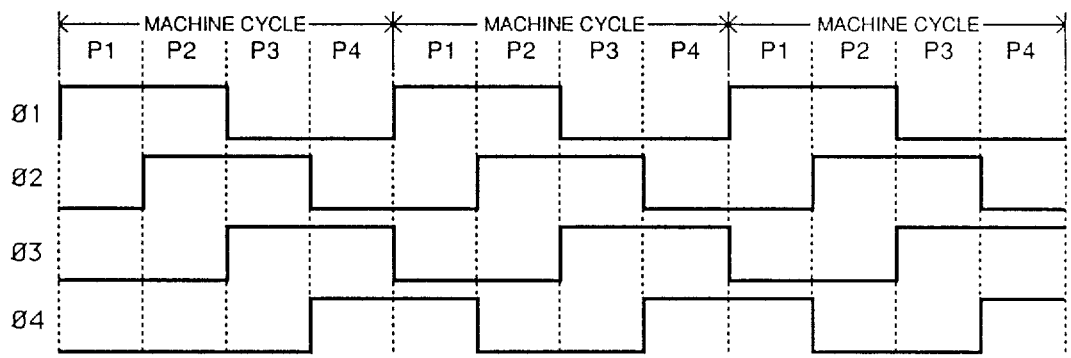
FIG. 11 is a timing diagram of the four phase output clocks produced by the clock generator in the CPU of FIG. 1.

The actual events occurring in the five segments of the pipelining in the CPU 10 of FIGS. 1–8 are more fully shown in FIG. 10. First, it will be noted with reference to FIG. 11 that the CPU 10 is clocked by the clock generator 44 to provide four phases P1, P2, P3, and P4, of equal length, in each machine cycle. These clock phases are used to drive the CMOS circuitry used to construct the CPU 10, in the example embodiment.

In segment-1 of FIG. 10, if the instruction unit 20 has a valid instruction and operand specifier present in the prefetch queue 90 during phase P1, then this information is decoded in the decoders 94 and 95 during P2 and P3, so that the output of the dispatch multiplexer 100 is available in P4 and the latch 101 is loaded with the dispatch address. Latch 102 is loaded in P4 with parsed specifier extensions, which are part of the instruction stream data.

In segment-2, the dispatch address is driven onto bus 25 during P1, and the control store 22 is accessed during P2 and P3. The microinstruction is available at the output 26 during P4 of this segment, ready for loading to the first level of controlled elements of the execution unit in P1 of the next cycle. Also in this segment-2, the specifier extensions, if any, are formatted in going from latch 102 through the formatter 103 to latch 104, and the data such as Sn and Rn is calculated and latched, and the AT/DL information is latched, so this data and control information will be available for the execution unit 21 via bus 38 at the beginning of the next cycle.

In segment-3 of the pipeline, also referred to as the CS0 segment, the execution unit 21 accesses the various registers or busses and places the data to be operated upon on the AABus 33 and ABBus 46, based upon the A and B control fields of the microinstruction available in a 34-bit CS0 latch 165, where it has been loaded via bus 28. The register file 50, the internal data bus 41, the immediate data bus 43, are all sources for the operands to be loaded to AABus and ABBus in this segment, as well as the remainder of the register set, including the program counter 56, the address registers 113, 114 and 115 in the memory management unit 30, etc.; all of these are set up to be available for read in P4 of this cycle. Also, the execution unit accepts the control bits on bus 38 during P1 of this segment.

In segment-4, also called the CS1 segment, the operation specified by the ALU Function part of the microinstruction, if it is a Basic or a Constant type as seen in FIG. 4, is performed in the ALU 45, or, if the microinstruction is a Shift, the operation specified by the Shift Function and Shift Value fields of the microinstruction is performed in the shifter 48. Since the control store 22 will be producing a new microinstruction during every cycle, it is necessary to have stored the microinstruction from the last cycle when the same microinstruction was used in segment-3; to this end, the microinstruction output 28 available from the control store is latched in the CS0 latch 165 and the output 165a of this latch is used for the operations performed in segment-3, then the microinstruction is latched at the end of the cycle via lines 165b into another CS1 latch 166 as seen in FIG. 3 so that the microinstruction is available via control lines 166a for implementing the ALU functions in the execution unit 21 in segment-4 using bits of the ALU function field of FIG. 4. Again, the output 166b of this latch 166 is stored in a similar CS2 latch 167 at the end of segment-4 (fourth clock cycle for this instruction) for use in segment-5 to implement the functions indicated in FIG. 10, i.e., using control bits on output 167a of the latch 167 (from the W field of the microinstruction of FIG. 4) the ALU output on write bus 35 is written to the register file 50.

The operation of the memory management unit 30 occurs in parallel with the pipeline segments of the execution unit 21. The microinstruction from bus 28 is latched in segment-3 into a different CS0 latch 168 seen in FIG. 6, then into another CS1 latch 169 in segment-4, so the microinstruction Memory Request field seen in FIG. 4 will be available as control bits on output 169a when needed. During P2 of the machine cycle of segment-4, the unit 30 sends a request to the bus interface unit 42 if the busses are going to be required. The unit 30 determines the address source defined by the microinstruction which is in the CS1 latch 169, among the possible sources of the ALU out bus 34, the VA register 113, etc, and the virtual address bus 110 has the selected address available during P4, and the translation buffer 111 makes the tag look-up. At the end of segment-4, the microinstruction is transferred via lines 169b from the CS1 latch 169 to the CS2 latch 170 through the multiplexer 171, if no delay is introduced by a fault or exception.

In segment 5, the write bus 35 is driven by the ALU 45 or shifter 48 output in the execution unit 21, and writes to the destination defined by the W field of the microinstruction in CS2 latch 167 as implemented by control bits on output 167a. The possible destinations include a selected register in the register file 50 or the other ones of the register set, the internal data bus 41 via the rotator 53, the AABus or ABBus for bypass, or the virtual address bus 110 in the memory management unit. During P1 of segment-5, within the memory management unit 30, the PTE is read to bus 119 and onto the internal address bus 31 via bus 32 if the translation buffer 111 has found a match, under control of control bits on lines 170a from the latch 170. The row decoder in the primary cache 40 receives the address from IA bus 31 during P2 and accesses the data and the tag by the end of P2, then the tag comparator 143 does the tag compare in P3; if there is a match then data is available on the internal data bus 41 at the end of P3 if a read is being performed or is written to cache memory 130 in P4 if it is a write. If there is no tag match, then a miss is signalled in P3 on line 147. In the memory management unit, if the translation buffer 111 does not detect a tag match, then an exception is determined by P2 of segment-5 and signalled to the microsequence 23 so that a routine to look up the page number for generating a physical address can be implemented by a trap.

The five-stage pipeline shown in FIGS. 9 and 10 can be conceptually separated into three semi-autonomous sections, each operating under independent control and performing distinct constituent sub-tasks of CPU instruction execution, but also cooperating to accomplish the overall goal of the CPU 10. Segment-1 and segment-2 comprise the first section of the pipeline. These segments primarily utilize the facilities of the I-Box 20 to parse and decode instruction stream data, to format this data, and to pass control and data information to the E-Box 21. The operation of the two I-Box segments is controlled by PLA-type state machines included in the I-Box 20. Segment-3, segment-4 and segment-5 (also labelled CS0, CS1 and CS2 segments in FIGS. 2, 6, 10 and 12) of the pipeline are implemented in part in both the E-Box 21 (via latches 165, 166 and 167) and the M-Box 30 (via latches 168, 169 and 170). These three segments function collectively to perform the actual work involved in a machine-level CPU instruction. Both the E-Box 21 and M-Box 30 derive control for their operation from the sequence of microinstructions provided to them by the microsequencer 23 via the microinstruction bus 28 which loads the latches 165 and 168 in each machine cycle; then in the next machine cycle the microinstruction in latch 165 is moved into latch 166, and that in latch 168 is moved into latch 169; likewise, in the following machine cycle the microinstruction in the latch 166 is moved into the latch 167 and that in latch 169 is moved into latch 170; these shifts are represented in FIGS. 12 and 13. Finally, the bus interface unit (BIU) 42 and P-Cache 40 make up the third autonomous section of the pipeline, which operates in conjunction with the E-Box 21 and M-Box 30 during segment-5 of the pipeline. The BIU 42 operates under control of memory access address and control information provided to it by the M-Box 30 via internal control bus 125, and acts as an arbiter for the use of external and some internal busses.

The scope of the present invention is limited to those pipeline segments CS0, CS1, and CS2 which operate under control of microinstructions as represented in FIG. 12 corresponding to the contents of latches 165-170, as shifted forward in successive machine cycles. As noted above, these three segments execute the arithmetic or logical computations actually specified in machine-level instructions. The three segments correspond to three basic phases of execution, namely operand access, arithmetic or logical computation, and result storing.

The microsequencer 23 implements a state machine which performs sequencing for microinstructions. The state machine is implemented as a three-phase micropipeline which provides a new microinstruction to the CS0 segment via latches 165 or 168 every CPU cycle. A microinstruction which enters the pipeline via latches 165 or 168 provides control to the pipeline segments for three consecutive cycles by being shifted into latch 166, then into latch 167 (or into latch 169, then into latch 170). FIG. 12 shows the overlap of microinstruction control shared between three consecutive microinstructions. During any single cycle, the CS0 segment of the E-Box and M-Box is controlled via lines 166a or 168a by the microword which entered the latches 166 or 168 of the pipeline this cycle. The CS1 segment is controlled by the microinstruction which entered the pipeline on the last cycle, and the CS2 segment is controlled by the microinstruction which entered the pipeline the cycle before that. In this manner, the microsequencer 23 provides a pipeline of microinstructions that is parallel to the corresponding segments of the E-Box and M-Box contributions to the pipeline. The utilization of a given microinstruction as control for the pipeline is spread across three CPU cycles, but the pipelined execution of microinstructions results in an effective throughput of one microinstruction per cycle through the CS0/CS1/CS2 section of the pipeline.

The M-Box 30 operates in accordance with the micropipeline, active during the CS1 and CS2 stages of microinstruction execution. The CS1 latch 169 is loaded with a microinstruction at phase P1 of the CS1 segment. Based on the memory request field in the CS1 latch 169, the control logic decides if the BIU 42 will be required in the CS2 stage 170 of the next cycle. If so, the M-Box 30 requests the BIU 42 at the end of phase P2 in segment CS1. During phase P3 the M-Box 30 determines the address source of the current microinstruction. Possible sources include the ALU out bus 34, the VA register 113, or the VAP register 114. The VA Bus 110 is driven with the address source at the beginning of phase P4 of CS1 via control bits on lines 169a, and a lookup for that address in the translation buffer 111 is performed during phase P4. In addition, the virtual address for every memory reference is latched into the M-Box's VA register 113 during the CS1 segment of microinstruction execution.

The CS2 latch 170 is loaded with the appropriate microinstruction at phase P1 of CS2. If the address driven on the VA Bus 110 during CS1 resulted in a tag hit, the corresponding PTE entry is driven on the IA Bus 32 starting at phase P2 of CS2. The P-Cache 40 uses the translated address on the IA Bus 32 for tag comparison during phase P3 of CS2. Read request data is then available from the cache at the end of the CS2 segment, or data is written into the cache at the beginning of the next cycle. The processor status register 61 is loaded with current information about state of the pipeline during phase P3 of CS2.

If the address on the VA Bus 110 during phase P4 of CS1 is not matched in the translation buffer 111, however, translation buffer logic will notify the microsequencer 23 of the TB miss during phase P4 of CS2. The microsequencer 23 aborts the normal advancement of the pipeline, but not until the beginning of the next phase P1. Note that this allows the faulting microinstruction to pass completely through the pipeline via latches 167 and 170 before the pipeline is halted. The microinstruction via control bits on lines 167a and 170a is able to update the processor registers with all information which is not otherwise affected by the faulting condition. The address which was unsuccessfully translated is tagged with a bit which identifies the address as one that has caused a translation fault. This bit indicates to the BIU that the specified memory reference should not be performed because of the faulting condition.

After being notified of an exception at the end of phase P4 of CS2, the microsequencer 23 disables the inputs to the CS0, CS1 and CS2 latches 165, 166, 167, respectively. At the beginning of the next CPU cycle, the microsequencer 23 stops the clocks to all of the latches in the microaddress silo 80, thus preserving the contents of the pipeline so that the pipeline may be restored after exception handling. Also at the beginning of the next cycle, the microsequencer 23 clocks the pipeline (but not the microaddress silo 80) causing all segments to advance. Because the CS0, CS1 and CS2 latches 165, 166, 167 have been disabled, however, each pipeline segment receives control signals which cause it to perform a no-op. The microsequencer 23 forces the appropriate control store address for an exception handling routine, produced by the trap control address generator 84, into the control store address latch at input 214 to start the fetch of the first microinstruction in the exception handling routine.

"Normal" pipeline processing of exception handling microinstructions continues for as long as necessary, while the addresses of microinstructions that would have been executed if the exception had not occurred remain un-clocked and preserved in the microaddress silo 80. During execution of exception handling routines, the M-Box's VA register 113 is prohibited from latching the addresses on the VA Bus 110 so that the faulting virtual address is preserved until the faulting conditions have been resolved and the memory reference can be successfully executed. The last microinstruction of the exception handling micro-routine is a unique instruction which causes the state of the pipeline saved in the microaddress silo 80 to be restored, and also causes the pipeline to resume normal operation, starting by re-creating the faulting memory reference. Upon restarting the pipeline after exception processing, the M-Box CS2 control segment including latch 170 and its outputs 170a begins a memory reference identical to the faulting reference by multiplexing the faulting virtual address in the VA register 113 onto the VA bus, and this is by inserting the faulting memory request control information from latch 169c into the microinstruction pipeline via mux 171. The pipe line stages are now clocked as normal, and the preserved sequence of microinstructions resumes execution as seen in FIG. 13.

FIG. 13 shows a sequence of microinstructions that is interrupted by an exception handling subroutine. In cycle 1, microinstruction n is controlling the computation operations of the CS1 segment (via bits on lines 166a of FIG. 2 and lines 169a of FIG. 6) of the microinstruction pipeline, while microinstruction n−1 is controlling the result store (CS2 segment (via bits on lines 167a of FIG. 2 and lines 170a of FIG. 6)) and microinstruction n+1 controls the operand access in the CS0 segment. In cycle 2, the pipeline stages have advanced, so that microinstruction n controls segment CS2, microinstruction n+1 controls segment CS1 and microinstruction n+2 enters the pipeline and controls segment CS0. Similarly, in cycle 4, the pipeline stages have advanced so that microinstruction n has exited the pipeline, and microinstructions n+1, n+2, and n+3 control the CS2, CS1, and CS0 segments, respectively.

For the purposes of illustration, in the microinstruction sequence of FIG. 13, assume that the virtual-to-physical address translation required for the memory reference in microinstruction n+1 is not contained in the Translation Buffer 111. This TB miss will be detected by the M-Box logic during phase P2 of segment CS2, and the microsequencer 23 will be informed of the exception during phase P4 of segment CS2, while the microinstruction n+1 is still in the latch 170. The faulting virtual address is latched into the M-Box's VA register 113 during phase P1 of CS2, and this register is not updated while exception handling is taking place. At the end of cycle 3, the CS0, CS1 and CS2 latches 165, 166, 167 respectively are disabled, so that when the pipeline is clocked again to enter cycle 4, each stage will effectively receive and execute no-op micro-instructions. During cycle 4, the microsequencer 23 loads the starting address of the exception handling routine into the control store address latch at input 24 of control store 22.

In cycle 5, exception processing begins with the CS0 execution of the first exception handler microinstruction, t. The no-op instruction in CS0 latches 165 and 168 during cycle 4 is advanced to CS1 latches 166 and 169 in cycle 5, and the no-op instruction in CS1 during cycle 4 is advanced to CS2 latches 167 and 170 in cycle 5. In cycle 6, the second exception handler microinstruction, t+1, enters the pipeline in the CS0 segment latches 165 and 168, while microinstruction t advances to the CS1 segment latches 166 and 169. Likewise, in cycle 7, exception handler microinstruction t+2 enters the pipeline, while microinstructions t and t+1 advance to consecutive segments CS2 and CS1, respectively.

Some time later, at cycle (5+m), the last microinstruction in the exception handling routine, t+m enters the CS0 segment of the pipeline. Microinstruction t+m is the unique "restore pipeline" microinstruction which instructs the CPU to restore the pipeline to the state preserved in the microaddress silo 80, and to reexecute the n+1 memory reference which caused the fault; this memory reference is re-executed by multiplexing via mux 171 the contents of latch 169c into the CS2 latch 170, so controls thus placed on lines 170a (representing the saved microinstruction) send the contents of the VA register 113 onto the VA bus 113. In cycle (6+m), microinstruction n+2 re-enters the CS0 segment of the pipeline, after being retrieved from the microaddress silo, where it was stored during exception handling. In cycle (7+m), the last exception handling microinstruction enters the CS2 segment of the pipeline, as microinstructions n+2 and n+3 advance to segments CS1 and CS0, respectively.

Notice that since the faulting microinstruction n+1 was allowed to pass completely through the pipeline before no-ops were inserted into the instruction sequence, microinstruction n+1 did not have to be re-executed upon re-starting the pipeline.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A processor comprising:
   (a) an execution unit having a plurality of execution stages for accessing operands from local registers, performing operations on said operands, and for storing results of said operations;
   (b) a memory interface unit having a plurality of stages including a memory-request stage for receiving memory address from said execution unit and a memory-access stage for evaluating said memory address to determine if said memory address is available for access and for accessing a memory if said address is available or for issuing an exception control signal if said memory address is not available for access;
   (c) pipelining means for applying sets of control bits to each of said stages of said execution unit and to each of said memory-request stage and said memory-access stage of said memory interface unit in successive ones of machine cycles of the processor.
   (d) latch means for holding a set of said control bits applied to said memory-access stage of said memory interface unit when said exception control signal is issued in a given one of said machine cycles, and for thereafter re-applying said set of control bits to said memory-access stage in a subsequent one of said machine cycles after said given machine cycle.

2. A processor according to claim 1 wherein said control bits are generated in a microinstruction store, and means are included for addressing said microinstruction store to produce a new microinstruction containing a set of control bits during each of said machine cycles.

3. A processor according to claim 2 wherein said addressing means is responsive to said exception control signal to cause addressing of a different sequence of said microinstruction.

4. A processor according to claim 3 wherein said different sequence of microinstructions functions to remove the condition which caused said exception control signal to be issued.

5. A processor according to claim 1 wherein said evaluating of said memory address includes tag comparison in a translation buffer and said exception control signal is issued when a match is not found in said tag comparison.

6. A processor according to claim 1 wherein said address-compare means is a translation buffer for storing page table entries for virtual addressing.

7. A method of operating a processor comprising the steps of:
   (a) pipelining execution of instructions in an execution unit, the execution unit having a plurality of execution stages for accessing operands from local registers, performing operations on said operands, and for storing results of said operations,
   while, in parallel, pipelining execution of said instructions in a memory interface unit having a plurality of stages, including a memory-request stage for receiving memory addresses from said execution unit and including a memory-access stage for evaluating said memory addresses to determine if available for access and for sending said memory addresses to a memory for accessing if available or for issuing an exception control signal if not available;
   (b) applying sets of control bits generated in a microinstruction store to each of said stages of said execution unit and said memory interface unit in successive ones of machine cycles of the processor,
   (c) holding a set of said control bits applied to a later one of said stages of said memory interface unit when said exception control signal is issued in a given machine cycle, and thereafter re-applying said same set of control bits to said later stage in a subsequent one of said machine cycles after said given machine cycle.

8. A method according to claim 7 including the step of generating said sets of control bits by addressing said microinstruction store to produce a new microinstruction containing a set of control bits during each of said machine cycles.

9. A method according to claim 8 wherein said addressing of said microinstruction store is responsive to said exception control to cause addressing of a different sequence of said microinstructions.

10. A method according to claim 9 wherein said different sequence of microinstructions functions to remove the condition which caused said exception control to be issued.

11. A method according to claim 7 wherein said evaluating said addresses is by a translation buffer storing page table entries for virtual addressing.

12. A method of operating a processor comprising the steps of:
   (a) executing pipelined instructions in an execution unit having a plurality of pipelined execution stages including a first stage for accessing operands from local registers, a second stage for performing operations on said operands, and a third stage for storing results of said operations;
   (b) while at the same time, in parallel, executing the same pipelined instructions in a memory interface unit having a plurality of pipelined stages including a memory request stage for receiving memory addresses from said execution unit, a memory-access stage for evaluating said memory addresses and for applying said memory addresses to memory access means if said evaluating indicates said memory address is available for access or for issuing an exception control signal if said evaluating indicates said memory address is not available for access;

(c) generating from a microinstruction store sets of control bits, one set for each cycle of operation of said processor, pipelining said sets of control bits by applying at least some of each one of said sets of control bits to each said first, second and third stages of said execution unit and to each one of said memory-request and memory-access stages of said memory interface unit in successive ones of said machine cycles, (d) holding said set of control bits applied to said memory-access stage of said memory interface unit when said exception control signal is issued in a given one of said machine cycles, and thereafter re-applying said set of control bits to said memory-access stage in a later one of said machine cycles after said given one.

13. A method according to claim 12 wherein said step of generating control bits includes addressing said microinstruction store to produce a new microinstruction containing said set of control bits during each of said machine cycles.

14. A method according to claim 13 wherein said addressing of the microinstruction store is responsive to said exception control signal to cause addressing of a different sequence of said microinstructions.

15. A method according to claim 14 wherein said different sequence of microinstructions functions to remove the condition which caused said exception control signal to be issued.

16. A method according to claim 15 wherein said evaluating of memory addresses includes tag comparison and said exception control signal is issued when a match is not found in said tag comparison.

17. A method according to claim 12 wherein said step of re-applying said control bits is done while a non-operative set of control bits are applied to other of said stages.

18. A method according to claim 12 wherein said memory-access stage evaluates said addresses in a translation buffer storing page table entries for virtual addressing.

19. A processor comprising:
(a) an execution unit having a plurality of execution stages including a first stage for accessing operands from local registers, a second stage for performing operations on said operands, and a third stage for storing results of said operations;
(b) a memory interface unit having a plurality of stages including a memory-request stage for receiving a memory address, a memory-access stage for evaluating availability of said memory address for access and receiving data from memory if available or for issuing an exception control signal if said memory address is not available for access;
(c) means for generating sets of control bits, one set for each machine cycle of operation of said processor, and pipelining means including clocking means for applying at least some of each one of said sets of control bits to each of said first, second and third stages of said execution unit and to each said memory-request stage and said memory-access stage of said memory interface unit, in successive ones of said machine cycles,
(d) latch means for holding said set of control bits applied to said memory-access stage of said memory interface unit when said exception control signal is issued in a given machine cycle, and for re-applying said set of control bits to said memory-access stage in a later one of said machine cycles after said given machine cycle.

20. A processor according to claim 19 wherein said means for generating control bits includes a microinstruction store and means for addressing said microinstruction store to produce a new microinstruction containing said set of control bits during each of said machine cycles.

21. A processor according to claim 20 wherein said means for addressing is responsive to said exception control signal to cause addressing of a different sequence of said microinstructions.

22. A processor according to claim 21 wherein said different sequence of microinstructions functions to remove the condition which caused said exception control signal to be issued.

23. A processor according to claim 22 wherein said evaluating of memory address includes tag comparison and said exception control signal is issued when a match is not found in said tag comparison.

24. A processor according to claim 19 wherein said memory-access stage includes a translation buffer for storing page table entries for virtual addressing, and said evaluating includes determining if said memory address is within the range of any of said page table entries.

25. A processor comprising:
(a) a pipelined execution unit having a plurality of pipeline stages, the execution unit including means providing memory addresses for memory access;
(b) a pipelined memory access unit having a plurality of pipeline stages including memory-test means and memory-access means, said memory access unit receiving a memory address from said execution unit and testing said memory address in said memory-test means to issue an exception control signal if a selected condition is detected or accessing a memory by said memoryaccess means if said selected condition is not detected;
(c) said execution unit and said memory access unit being controlled by sets of control bits received from a control store and applied to said pipeline stages in successive machine cycles of the processor;
(d) and means for holding a set of control bits applied to said memory-access means if said exception control signal is issued in a given machine cycle, then re-applying said set of control bits to said memory-access means in a subsequent machine cycle after said given machine cycle.

26. A processor according to claim 25 wherein said memory-test means includes a translation buffer holding page table entries.

27. A processor according to claim 25 wherein said control store includes addressing means and said exception control signal is received in said addressing means to cause a jump to a routine to remove said selected condition.

* * * * *

UNITED STATES PATENT AND TRADEMARK OFFICE
CERTIFICATE OF CORRECTION

PATENT NO. : 4,875,160

DATED : OCT. 17, 1989

INVENTOR(S) : John F. Brown, III, Northborough, Mass.

It is certified that error appears in the above-identified patent and that said Letters Patent is hereby corrected as shown below:

Column 2, line 3, after "CPU" insert -- executes is stored in a particular region of memory. An --

Column 6, line 57, after "form of" insert -- the execution unit of the CPU of Figure 1;

Column 7, line 54, after "connected" insert -- back to an input 27 of the microsequencer 23 to provide --

Column 8, line 51, after "the bus" insert -- 28. The output of the ALU is always to a result bus 47, --

Column 13, line 35, after "via" insert -- bus 120, are one input to a multiplexer 122 and the 21-bit --

Column 15, line 61, change "67" to -- 6 --

Signed and Sealed this

Eighteenth Day of September, 1990

Attest:

HARRY F. MANBECK, JR.

*Attesting Officer*  *Commissioner of Patents and Trademarks*